Sept. 22, 1953  J. H. WILSON  2,653,041
FLUID TIGHT ROTARY COUPLING
Filed Aug. 22, 1949

INVENTOR.
John Hart Wilson
BY
Wayland D. Keith
HIS AGENT

Patented Sept. 22, 1953

2,653,041

UNITED STATES PATENT OFFICE 2,653,041

FLUID TIGHT ROTARY COUPLING

John Hart Wilson, Wichita Falls, Tex.

Application August 22, 1949, Serial No. 111,614

1 Claim. (Cl. 285—97.3)

This invention relates to fluid tight rotary couplings, and more particularly to a coupling structure by which a fluid under pressure from a stationary source may be conducted to a passage in a rotating member.

The invention has for its chief object the provision of a rotary coupling structure for conveying fluids from a stationary source to a rotating member, wherein means is employed for effectively preventing the escape of fluids between the parts of the coupling, and also for preventing the entrance of lubricants employed in lubricating the bearings of the coupling into the passage through which the fluid is conveyed.

A further object of the invention is the provision of a rotary coupling of the kind described, in which anti-friction bearings are employed between the stationary and rotating members, and the bearings are effectively sealed against contact with the fluid conveyed.

A still further object of the invention is to provide lubricating means for a rotary coupling of the type referred to, including means for effectively distributing lubricants to the bearing surfaces, while excluding therefrom the fluid being conveyed through said coupling, and also preventing the entrance of foreign matter in the lubricant into the bearings.

The invention will best be understood by reference to the following description, constituting a specification of the same, when taken in conjunction with the annexed drawing wherein—

Figure 1:
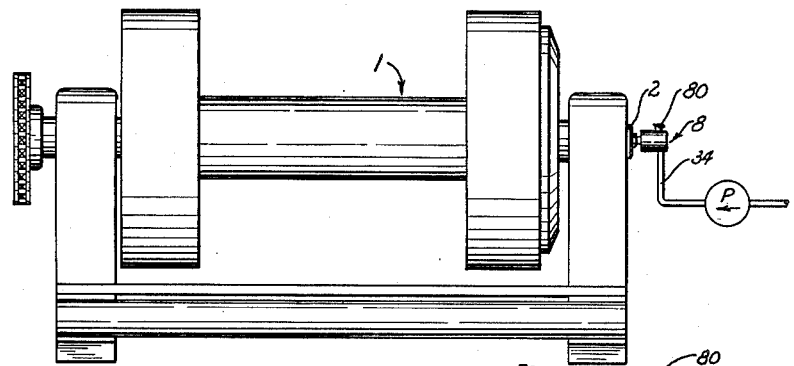
Fig. 1 is a side elevational view of a rotating member to which the invention is applied.

Referring to the drawings in greater detail, the numeral 1 indicates generally a rotating member to which fluid under pressure is to be supplied. The rotating member may have a shaft 2 in which a passage 3 is located, and the fluid tight rotary coupling may be attached to this shaft in communication with the passage 3 by means of the internal screw threaded portion 4.

The rotary coupling comprises a rotating tubular member 6, which extends within and is rotatably coupled to a generally cylindrically shaped stationary member 8. The rotating member 6 has at one end a threaded portion 10, adapted for insertion in the member 2 for cooperation with the threads 4 therein, to secure the members 2 and 6 together. Packing elements, such as packing rings of conventional construction, indicated at 12 and 14, may be positioned between the members 2 and 6, to assure a fluid tight connection between these members.

The coupling member 6 is preferably formed with an enlarged hexagonal portion 16, for the reception of a wrench or the like, used in applying this member to the rotating member 2, and also has an elongated portion 18 and a somewhat shorter portion 20 of larger diameter, extending within the stationary member 8 of the coupling. An annular groove 22 is formed in the portion 18, adjacent the outer extremity thereof, for a purpose later to be explained. A cylindrical bore 24 extends completely through the member 6, forming a fluid passage therethrough, opening into the passage 3 in the rotary member 2.

Stationary element 8 of the coupling is formed with a cylindrical bore 26 of relatively large diameter, for the purpose of permitting the bearing elements of the coupling to be inserted therein, which bore terminates in a bore 28 of smaller diameter, opening in turn into another bore 30 of still smaller diameter adjacent the closed end of the member 8. The bore 30 opens into a threaded passage 32 at right angles thereto, into which an inlet pipe 34 is threaded, leading to a stationary source of fluid under pressure.

Within the interior of the member 8 a coil spring 36 is on the bottom of the bore 30 which engages a washer 38, urging the same into contact with a cylindrical element 40, preferably formed of graphite, carbon, or similar material capable of making fluid tight contact with the end surface 42 of the rotating member 6. The end surface 42 of rotating member 6, and the adjacent engaging surface of the graphite member 40, are finished surfaces, whose fluid tight engagement is assured by lapping or similar treatment, and the graphite element has a bore, forming a continuous passage with the bore 24 of the rotating member 6. A tapered portion 44 is formed on the end of the graphite member 40, which engages the washer 38, for a purpose later to be made apparent.

A bearing structure, comprising inner and outer races 46 and 48 respectively, between which are positioned ball bearings 50, is positioned on the portion 18 of the rotating member 6 within the larger bore 26 of the stationary member 8. This bearing is retained on the portion 18 by engagement with a shoulder 52, and a spring ring 54, received in the groove 22. Sealing ring 56 is also provided on the bearing structure, in engagement with an annular sealing element of the labyrinth type 60, surrounding the portion 20 of the rotating member 6, and retained in the stationary member 8 by means of a spring ring 62 positioned in the internal groove 64 in the bore 26.

Figure 2:
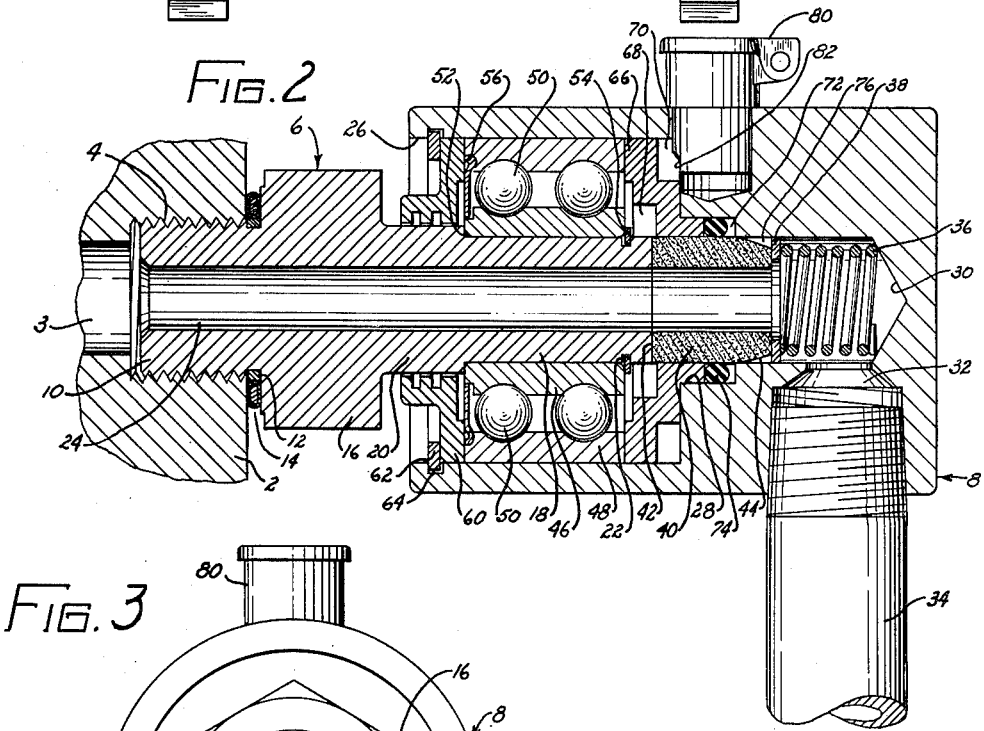
Fig. 2 is a cross-sectional view, on a somewhat enlarged scale, showing the construction and relationship between the various parts of the coupling.
Figure 3:
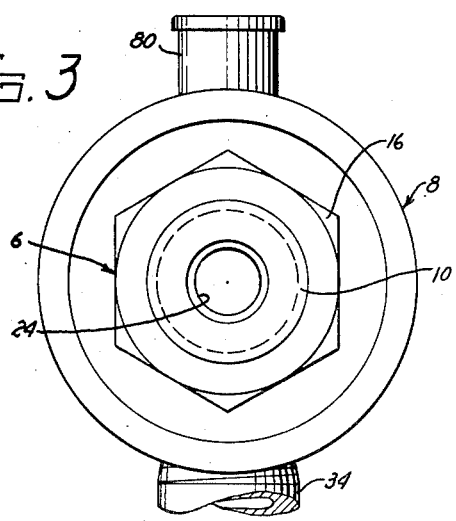
Fig. 3 is an end elevational view of the invention, detached from the member to which the fluid is to be conveyed, as seen from the left and end of the device as shown in Fig. 2.

An annular lubricant, distributing and filtering member 66, is positioned in the bore 26 in engagement with the ball bearing structure therein, said lubricant dispensing member being of step formation, as clearly indicated in Fig. 2, and extending into the bore 28. By reason of the step formation of the member 66, annular cavities 68, 70 and 72 are provided within the stationary member 8. The cavity 72 surrounding the graphite member 40 has positioned therein a packing ring 74, preferably formed of relatively soft material, such as rubber or the like. By this construction fluid under pressure from the stationary source may enter the cavity 30 in the stationary member 8, from whence it will escape past the washer 38 into a cavity 76 formed by the tapering portion 44 of the graphite member 20. The fluid may then pass from the cavity 76 into the cavity 72, where it is effective to press the packing ring 74 into close engagement with the graphite member, the wall of the cavity 28, and the end surface of the lubricant distributing element 66, thereby forming a very tight seal, preventing the escape of pressure fluids into the bearing structure, or into the lubricant chamber of the coupling.

The annular cavity 70 forms a lubricant receiving chamber in communication with an oil cup 80, or the like, through an opening 82 in said cup. The lubricant distributing member 66 may be formed of sintered metal, for example compressed powder bronze, having a somewhat porous nature, whereby lubricant from the chamber 70 filters through the sintered metal and is distributed to the various surfaces in engagement with the member 66. The moving parts of the coupling structure are thus maintained in a properly lubricated condition at all times, and dirt or other foreign materials which may be contained in the lubricant is retained in the chamber 70 by reason of the filtering action of the member 66, and thus prevented from reaching the various bearing surfaces of the structure.

In assembling the above described rotary coupling structure, the spring 36 is first introduced into the cavity 30, and the washer 38 positioned thereon. The packing ring 74 is positioned in the cavity 28, and the graphite member 40 inserted therethrough, which operation is more readily accomplished by reason of the tapering end portion 44 of the graphite member. The lubricant distributing member 66 is then inserted into the cavity 26, with the step portion of smaller diameter extending into the cavity 28, surrounding the graphite member 40. Into the stationary part of the coupling structure as thus assembled the rotating member 6 is inserted, first having assembled therewith the labyrinth sealing member 60 on the portion 20, and the ball bearing structure on the portion 18, whereon the same is retained by means of the spring ring 54, seated in the annular groove 22. The assembly so made up is retained in the bore 26 by a spring ring 62 seated in the internal groove 64 in the bore 26.

When assembled in the manner described the rotating member 6, carrying the inner race 46 of the ball bearing structure rotates on the ball bearings 50, and the remaining parts of the coupling structure are held stationary. It will be evident that the structure described provides a continuous passing for fluids from the stationary source to the rotating member 2 without any substantial leakage of the fluids from the passage into the various parts of the coupling structure, and without the entrance of lubricants into the fluid passage.

When it is desired to dismantle the coupling, the spring ring 62 is removed from the groove 64, whereupon the rotating member 6 carrying the ball bearing structure and the labyrinth sealing member can be withdrawn from the stationary member 8. The rotating parts of the structure can be disassembled by merely removing the spring ring 54 from the annular groove 22 in the member 6, after which the ball bearing structure can be slipped off the portion 18 and the labyrinth sealing member can be removed from the portion 30. The oil distributing member 66 can be extracted from the bore 26, if desired, and thereafter the graphite element 40, packing ring 74, washer 38 and spring 36 may be removed in turn.

It will thus be seen that the invention as revealed in the above description provides a fluid tight rotary coupling of simple design and rugged construction, whose parts are readily replaceable for purposes of replacement and repair, and which is capable of withstanding the adverse conditions of use, and long wear usually required of such a device.

While the invention has been described in accordance with a particular construction and mode of operation, it is to be understood that many changes in the details of structure and arrangement of the various parts may be made by a person skilled in the art to which the invention pertains, without departing from the spirit of the invention, or the scope of the appended claim.

Having thus clearly shown and described the invention, what is claimed as new and desired to secure by Letters Patent is:

In a rotary type coupling for connecting an axial opening formed in a rotating shaft with a source of fluid pressure, which pressure is to be conveyed to said axial opening in said shaft while said shaft is rotating, the combination of a rotatable coupling having an axial bore formed therein adapted to be attached to said shaft in fluid-tight relation thereto with said bore in communication with said axial opening in said shaft, an anti-friction bearing having inner and outer races, the inner race thereof being seated upon said rotatable coupling element, a stationary coupling element having a recess formed therein, which recess receives the outer race of said anti-friction bearing for journaling said stationary coupling element on said rotatable coupling element, a lubricant seal closing one end of said recess formed in said stationary coupling element, a lubricant fitting connecting with said recess formed in said stationary coupling element, a porous metallic annular filter member positioned in said recess intermediate said lubricant fitting and said anti-friction bearing, a graphite sealing element having an axial bore formed therethrough, which sealing element is in interfitting bearing relation with the inner diameter of said porous metallic annular filter so as to direct lubricant through said porous metallic annular filter to said bearing between said annular filter and said sealing element, resilient means for urging said graphite sealing element into end to end sealing engagement with said rotatable coupling element so as to couple the axial opening in said graphite sealing element with the axial opening in said rotatable coupling element, conduit means connecting said source of fluid pressure with said recess in said stationary coupling element for passage of fluid therethrough and an O-ring sealing element positioned within said recess in said stationary coupling element so as to be in contact sealing relation with the inner diameter of said recess formed in said stationary coupling element, a surface of said annular porous metallic filter member and the outer diameter of said graphite sealing element.

JOHN HART WILSON.

References Cited in the file of this patent

UNITED STATES PATENTS

| Number | Name | Date |
|---|---|---|
| 2,370,471 | Karlberg | Feb. 27, 1945 |
| 2,462,006 | Schmitter et al. | Feb. 15, 1949 |